United States Patent [19]
Feichtner

[11] 3,832,649
[45] Aug. 27, 1974

[54] FLUIDALLY CONTROLLED DYE LASER
[75] Inventor: John D. Feichtner, Murrysville, Pa.
[73] Assignee: Westinghouse Electric Corporation, Pittsburgh, Pa.
[22] Filed: May 15, 1973
[21] Appl. No.: 360,697

[52] U.S. Cl. .............................. 331/94.5 L, 330/4.3
[51] Int. Cl. ............................................. H01s 3/02
[58] Field of Search ................... 331/94.5; 330/4.3

[56] References Cited
UNITED STATES PATENTS
3,688,216  8/1972  Kocher et al. .................... 331/94.5

Primary Examiner—William L. Sikes
Attorney, Agent, or Firm—D. Schron

[57] ABSTRACT

A fluidally controlled dye laser having at least one laser cavity through which a laser dye solution flows and at least one source of dye solution. The laser cavity is connected to the source of dye solution by a conduit having an inlet nozzle connected to the dye source and a pair of outlet channels, one of which is connected to the cavity. The conduit is designed to provide a flow from the inlet nozzle to either outlet channel that conforms to the Coanda effect. Positioned ahead of the junction or splitter of the inlet nozzle and outlet channels are a pair of fluidic control nozzles transversely positioned with respect to the flow of dye solution from the inlet nozzle for switching the flow of solution from one outlet channel to the other. The control nozzles are connected to a source, preferably pressurized, of control fluid and means for controlling the flow of fluid from said nozzles.

7 Claims, 6 Drawing Figures

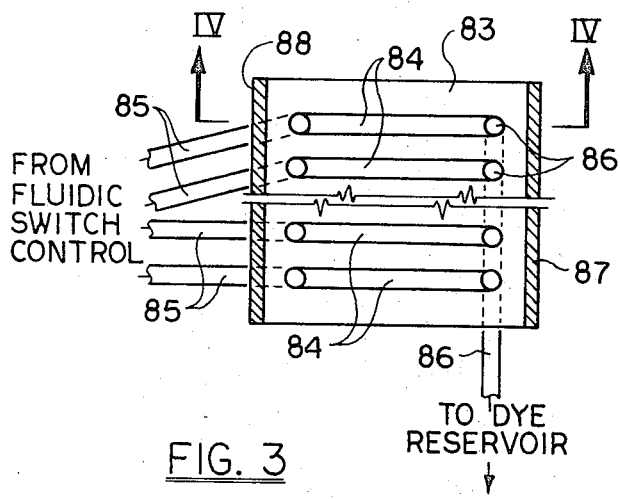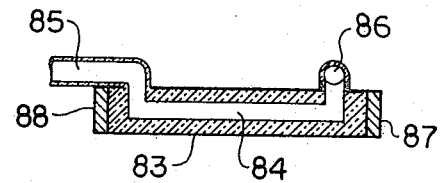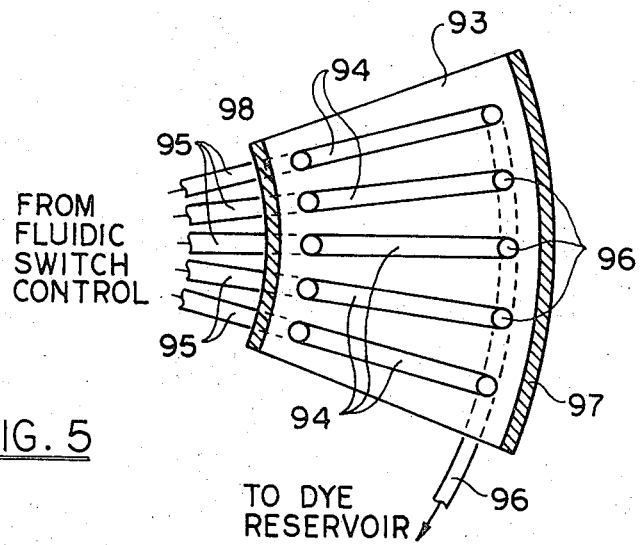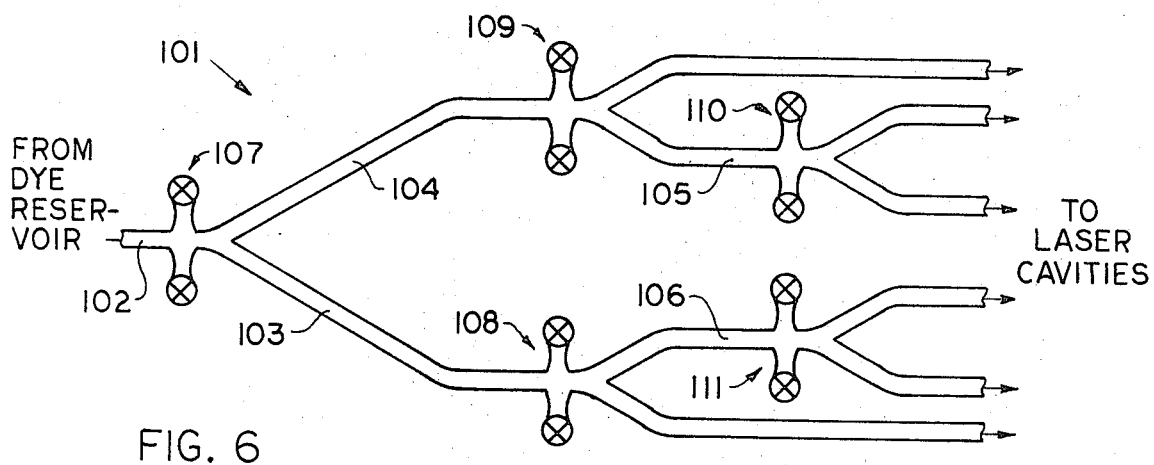

FLUIDALLY CONTROLLED DYE LASER

BACKGROUND OF THE INVENTION

In recent years tunable lasers have replaced many conventional spectrophotometers and spectrofluorometers as general purpose optical measurement tools. Of the tunable lasers, the dye laser has achieved the most prominence. Because the emission bands of organic dye molecules are typically several hundred angstroms wide and demonstrate high gain, the addition of dispersive elements in the laser cavity permits tuning over this band. Many compounds have been developed which span the region 3410-11750A in bands of a few hundred angstroms each. Dry lasers have also been mode locked by a variety of techniques.

Presently, beam positioning and modulation of dye laser output characteristics are generally performed by methods used in other types of lasers. These methods include the utilization of electro-optical devices such as a Pockel's cell, mechanical scanning means, saturable absorbers, acousto-optical devices and the like. The electro-optical and acousto-optical devices and methods are the fastest, most controllable and efficient means for modulating output characterisitcs. They are not, however, suitable for achieving efficient beam scanning over wide angles. Mechanical scanning, on the other hand, is efficient but slow and inaccurate and very difficult to effectively utilize for random access scanning. Saturable absorbers while useful for Q-switching and mode-locking are not suitable for scanning.

Furthermore, the broad fluorescent linewidth of dyes used in dye lasers makes it possible to tune the output over their wavelength region by using a dispersive element in the laser cavity such as a prism or Fabry-Perot interferometer. While the Fabry-Perot interferometer can be piezoelectrically tuned, the narrow gap required can detract from the physical stability of the device. Prisms must be mechanically scanned and the laser cavity must be maintained in precise alignment to achieve tuning by the prism. Blazed gratings have been used as one of the end mirrors of the laser cavity and tuning achieved by angular displacement of the grating. Tuning is mechanical and 100 percent efficiency is never obtained.

Notwithstanding the limitations inherent in present devices and methods, an important limitation exists in all of these devices in that they are restricted to a relatively narrow wavelength region of the specific dye concentration utilized. It is well known that changing the concentration of the dye solution will change the wavelength of the peak fluorescence and, hence, wavelength. For example as the concentration is increased, the laser band is smoothly shifted to longer wavelengths. See 25 *Optical Spectry.* (USSR) 404–406 (1968).

It is therefore an object of the present invention to provide a method and means for rapidly changing the dye solution in a laser cavity such as to increase or decrease dye concentrations or inject absorber dyes, gases or gas bubbles to quench laser oscillation. It is a further object of the present invention to provide a method and means of controlling or modulating the velocity of a dye solution to affect the thermal characteristics of the pumping-fluorescence phenomenon in the dye solution. Another object of the invention is to provide a method and means for switching dye flow from a laser cavity oriented in one direction to a cavity oriented in a different direction to achieve beam positioning.

SUMMARY OF THE INVENTION

The present invention is addressed to dye lasers in which the dye solution flows through a laser cavity or cell. The invention takes advantage of the "Coanda effect" which is exhibited by flowing streams of fluid; i.e., the tendency of a jet of fluid to follow the wall contour when discharged adjacent the surface thereof, even when that surface curves away from the axis of discharge.

The present invention utilizes fluidic controls or switches to effect changes in the flow of dye solutions to one or more laser cavities or to change the concentration of dye solutions by mixing two or more streams of different solution concentrations directed to a single laser cavity. Fluidic control is achieved by passing a fluid transversely to the discharge axis of the dye solution causing it to follow a different surface. Switching can be achieved in a matter of milliseconds.

Generally, the fluidally controlled dye laser of the present invention comprises at least a first laser cavity which is adapted for flow therethrough of a solution of laser dye. The laser cavity typically includes an inlet and outlet port connected to a pump and reservoir, respectively. At least one source of dye solution such as a reservoir is utilized. For example, in a laser where the concentrations of the dye are changed, at least two reservoirs are preferred, but when beam positioning is desired, only one is required.

Between the source of dye solution and the optical cavity is a conduit having a supply or inlet nozzle, and a pair of outlet channels connected to the inlet nozzle. Preferably, the conduit is Y-shaped to effectuate a Coanda effect flow therethrough. The inlet nozzle of the conduit is connected to and in communication with the source of dye and at least one of the outlet channels is connected to an optical cavity. Positioned immediately ahead of the junction of the inlet nozzle and the outlet channels are a pair of fluidic control nozzles. The nozzles of the fluidic control are positioned transversely of the inlet nozzle of the conduit and preferably a distance of about six times the width or diameter of the inlet nozzle from the apex or junction formed by the outlet channels or splitter. Each nozzle is connected to a pressurized source of fluid. Preferably interposed between the fluid sources and the nozzles are means, such as transducers or valves for controlling the flow of fluid from a fluid source to its associated fluid control nozzle. Thus fluidic control is achieved by a jet-type nozzle which permits simple switching operations by the wall-attachment mechanism (Coanda effect). Accordingly, when a fluid stream is supplied to the supply inlet nozzle of the conduit, the fluid will flow to one of the outlet channels. The output flow can be switched from either outlet by a controlled flow applied to either of the control nozzles. Since the wall-attachment effect maintains the fluid stream position, the control fluid may be removed without changing the output. The same effect can be achieved in the present invention with elements other than the jet type, for example, an induction type element.

In the case where the dye concentrations are to be varied, a number of conduits equal in number to the number of dye sources are utilized. At least one outlet from each conduit is connected to the laser cavity or a mixing chamber. Thus, by selecting the proper sources of dye, various concentrations can be formulated substantially instantaneously. Where beam positioning is desired, utilizing a single dye source, a number of conduits can be effectively incorporated to select the desired laser cavity. The number of conduits is preferably equal to one less than the number of laser cavities. The inlet nozzle of each succeeding conduit after the first is preferably connected to an outlet channel of a preceding conduit. Each conduit includes a pair of fluidic control nozzles for directing the laser dye soltion to the proper laser cavity.

Where at least two dye sources are used, one of the dye sources can be an absorber for the radiation at the wavelength of the other dye. A mixture of the two provides a reduction of the laser output power by loss modulation. Alternatively, a liquid or gas in solution can be substituted which either quenches or enhances the fluorescence of the other dye or in which gas bubbles form to degrade the cavity's optical properties.

Other features and advantages of the invention will become apparent from a perusal of the following detailed description of presently preferred embodiments taken in connection with the accompanying drawings.

BRIEF DESCRIPTION OF THE DRAWINGS

FIG. 3 is an elevation of a plurality of laser cavities located in a transparent slab which are connected to a fluidic control device for beam positioning;

FIG. 4 is a section taken along line IV—IV of FIG. 3;

FIG. 5 is an alternative embodiment of a plurality of laser cavities; and

FIG. 6 is a diagrammatic view of a fluidic control useful for a dye laser having a plurality of laser cavities.

PRESENTLY PREFERRED EMBODIMENTS

Figure 1:
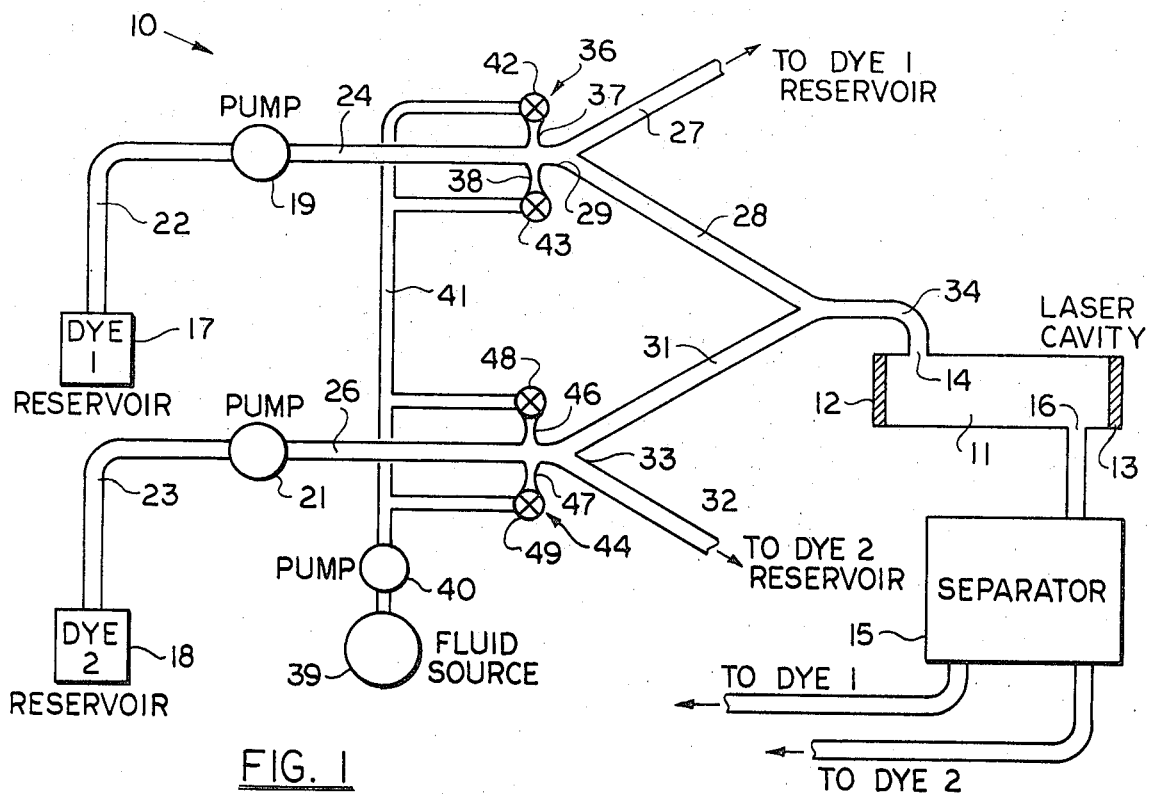
FIG. 1 is a diagrammatic view of a fluidically controlled dye laser for wavelength switching, amplitude modulation or Q-switching.
Figure 2:
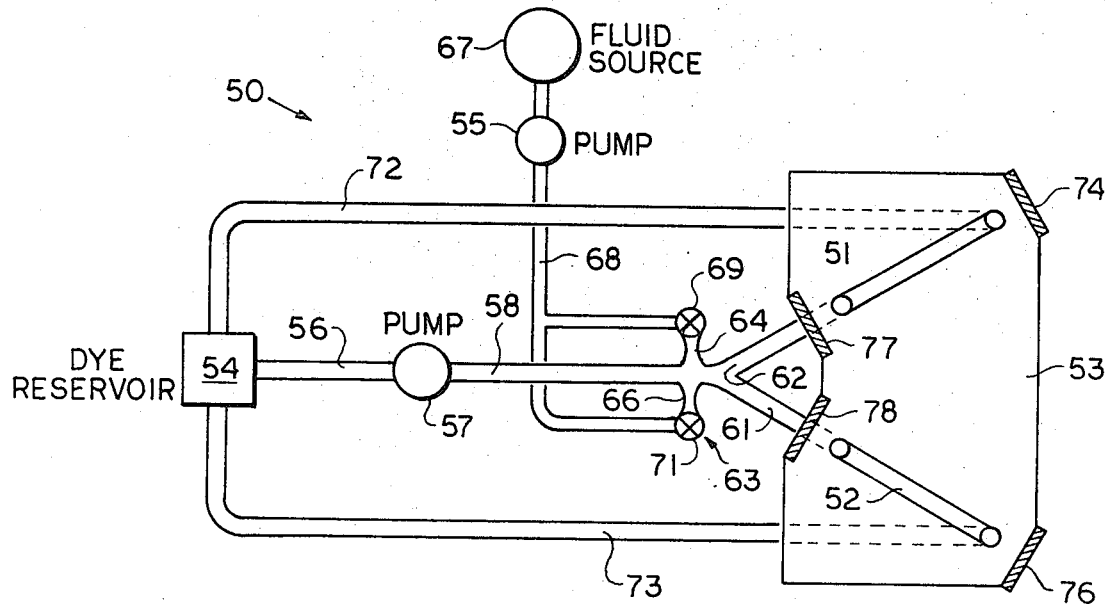
FIG. 2 is a diagrammatic view of a fluidically controlled dye laser for beam positioning.

Referring to FIG. 1, a fluidically controlled dye laser 10 comprises a laser cavity 11 having mirrors 12 and 13. Laser cavity 11 includes an inlet port 14 and an outlet port 16 for flow therethrough of a laser dye solution. Laser 10 includes a first dye reservoir 17 and a second dye reservoir 18.

First and second reservoirs 17 and 18 are connected through pump means 19 and 21, respectively, to first and second conduits 22 and 23. First and second conduits 22 and 23 are preferably Y-shaped, but can take other configurations to achieve the Coanda effect, and include inlet nozzles 24 and 26, respectively. Conduit 22 includes pairs of outlet channels 27 and 28 which join nozzle 24 at junction or splitter 29. Second conduit 23 includes a pair of outlet channels 31 and 32 connected to inlet nozzle 26 thereof through junction or splitter 33. Inlet nozzles 28 and 31 of first and second conduits 22 and 23, respectively, are connected to a common passage 34 which can comprise a mixing chamber or simply a connection to inlet port 14 of laser cavity 11. Outlet channels 27 and 32 are connected to their associated reservoirs 17 and 18, respectively.

Positioned adjacent junction 29 is first fluidic control means 36 for switching the flowing to either of the outlet channels 27 or 28. Fluidic control means 36 includes a pair of fluid control nozzles 37 and 38 positioned transversely to inlet nozzle 24. Control nozzles 37 and 38 are connected to source of fluid 39, such as water, ethyl alcohol, toluene or other commonly used dye solvents, by means of fluid line 41. Fluid source 39 is preferably pressurized or may include a pump 40 which is connected to line 41. Interpositioned between line 41 and nozzles 37 and 38 are valves 42 and 43, respectively. A similar fluidic control means 44 is positioned adjacent junction 33 of conduit 23. Fluidic control 44 includes a pair of fluid control nozzles 46 and 47 connected to fluid line 41 by means of valves 48 and 49. Nozzles 46 and 47 are positioned transversely of conduit inlet nozzle 26.

Preferably, valves 42 and 43 and valves 48 and 49 are remotely controlled or controllable by means of a transducer, solenoid or the like.

In the operation of fluidally controlled dye laser 10, a first dye solution is pumped from reservoir 17 by conduit 22 into outlet channel 27 thereof to circulate a first dye solution, for example, an aqueous solution of Rhodamide 6G. Other dye solutions are also suitable; for an example of various dyes suitable for use in dye lasers see, 19 *Applied Physics Letters* 345–348 (1971). The second dye is also caused to circulate from reservoir 18 through conduit 23 and outlet channel 32 thereof and back to reservoir 18. Both circulating dyes follow the Coanda effect during passage from inlet nozzles 24 and 26 to outlet channels 27 and 32, respectively. Moreover, the flow rates are similar to those rates of conventional dye lasers, typically about 30m/sec. First and second dyes can be the same, for example, Rhodamide 6G having different concentrations or can be different dyes or fluids, such as water to affect dilution of the other dye.

Laser cavity 11 is continually pumped either transversely or longitudinally by shorter wavelength pump radiation. Pumping can be achieved by means of a cw laser such as an argon laser or by means of a flashlamp. Thus, a conventional dye pumping means is suitable for use in the present invention.

When dye lasing is desired, fluidic control 36 is activated to permit a fluid to pulse flow from nozzle 37 into the stream of flowing solution. First dye solution is hence diverted from outlet channel 27 to outlet channel 28 to flow through laser cavity 11 and discharged through cavity outlet 16. Discharged dye solution is preferably saved and this can be achieved by means of a fluidic switch in series with fluidic controls 36 and 44. That is, when only one dye solution is circulating through cavity 11 it is recirculated back to its associated reservoir. However, if both controls are operating to permit passage of both first and second dye solutions through cavity 11, the mixture would be separated by means of separator 15.

The characteristic switching times for fluidic controls 36 and 44 are on the order of a few milliseconds. Moreover, since the flow rates of the dye solutions are quite fast, e.g., 30m/sec. it is possible with laser 10 to generate color fusion when observed by the human eye. Thus for display purposes first and second dyes can be continuously switched to alternate flow through cavity 11 and generate a continuous variation of apparent color over a wide range.

With three dyes, for example, and varying the switching rate, it is possible to generate apparent colors over the entire visible spectrum. Alternatively, it is possible to achieve an actual continuous variation of laser output by controlling the dye concentration upon which the fluorescence spectrum depends. For Rhodamide 6G, for example in water, fluorescence can be achieved in the range of 570 nm to 615 nm for concentrations of $1.5(10)^{-4}$ to $3.0(10)^{-4}$M. In this case the second dye solution can be water or a solvent plus a triplet state quenching agent flowing continuously and the first dye soltuion can be a concentrated solution of Rohdamide 6G. The concentration of Rhodamide 6G flowing throug cavity 11 can be continuously varied by controlling nozzle 47 of fluidic control 44 to permit controlled amounts of water from conduit outlet channel 31 to mix with the Rhodamide 6G concentrate. In this case it is preferable to utilize a mixing chamber 34 prior to introduction into cavity 11.

Fluidally controlled dye laser 10 can also be utilized to achieve amplitude modulation or Q-switching. In this mode, first dye solution contains a dye such as Rhodamide 6G and the second solution can be an absorber for the radiation at the wavelength of Rhodamide 6G. By switching the continuously flowing second soltuion from outlet channel 32 into channel 31 reduction of laser output power is affected by loss modulation. If, on the other hand, the second solution is a liquid or gas in solution, the fluorescence of the first dye solution can be either quenched or enhanced. Enhancement of fluorescence is achieved by quenching the triplet state by the use of oxygen. By injecting a substance which absorbs pump radiation, but does not transfer the radiation to the lasing dye, the laser power can be modulated. By injecting a substance which absorbs pump radiation over a broad spectral region and resonantly transfers this energy to the upper lasing level of the dye molecule, laser power can also be modulated. Loss modulation is affected by formation of gas bubbles which degrade the optical properties of the laser.

Q-switching by saturable absorption also can be achieved if the second solution is a saturable absorber at the wavelength of the first dye which is the lasing solution.

Referring to FIGS. 2–6, a fluidally controlled dye laser 50 is shown. Laser 50 comprises first and second laser cavities 51 and 52, respectively. Laser cavities 51 and 52 are formed in a thin transparent slab 53 preferably made of glass. Laser 50 includes a reservoir 54 of a dye solution connected to cavities 51 and 52 by means of Y-shaped conduit 56. Conduit 56 includes a pump 57 located in front of inlet nozzle 58. Inlet nozzle 58 is connected to outlet channels 59 and 61 of conduit 56 at junction or splitter 62. Channels 59 and 61 are preferably connected to laser cavities 51 and 52, respectively, perpendicularly to the plane of slab 53. Junction 62 is provided with a fluidic control means 63 having a pair of transversely positioned control nozzles 64 and 66. Nozzles 64 and 66 are connected to a fluid source 67 via line 68 and valves 69 and 71, respectively. Preferably, fluid source 67 is pressurized or may include a pump 55. Preferably, cavities 51 and 52 discharge dye solutions back to reservoir 54 via lines 72 and 73, respectively.

Since the fluidic circuits of control 63 and the dye laser cavities 51 and 52 make use of narrow channels in glass substrates, these element could be fabricated in a single substrate. Repetitively pulsed laser pumping would be external to the substrate. Additionally, it is possible to continuously pump the dye solution. Beam positioning is achieved by switching the flow of laser dye to either cavity 51 or cavity 52 by means of control 63. Since most dye lasers have very high gain and operate in many cases in an amplified spontaneous emission mode, feedback mirrors are not usually important. However, if feedback is required, mirrors 74 and 77 and mirrors 76 and 78 can be provided at the ends of cavities 51 and 52, respectively.

Alternatively, a plurality of laser cavities can be provided having inlets and outlets positioned normal to the planar surface of the transparent slab. FIGS. 3–5 are exwmplary of a laser having a plurality of cavities for beam positioning. A slab 83, FIG. 3, or slab 93, FIG. 5 of rectangular and curvilinear configuration, respectively, are provided with a plurality of optical cavities 84 and 94, respectively. Each cavity is connected to supply inlet 85 or 95 which is connected to a fluidic control device. Each of the inlets 85 or 95 would be connected to separate outlet channel of a fluidic control such as shown in FIG. 6. Discharge of laser dye from the various cavities 84 or 94 can be via a common return 86 or 96, respectively, to a dye reservoir. Transparent slab 83 includes mirrors 87 and 88 which are 98 percent and 100 percent reflective, respectively, at the desired wavelength. Transparent slab 93 is provided with arcuate mirrors 97 and 98 which at the desired wavelength are 98 percent and 100 percent reflective, respetively. Substantially the same type of flow circuitry is employed with slabs 83 and 93 as with slab 53 of laser 50. The principal difference is the necessity for utilizing a more complicated fluidic control device.

Fluid circuit 101, FIG. 6, is an example of a combination of flow circuitry and fluidic control means for use in a laser designed with six laser cavities. Fluid circuit 101 preferably utilizes five Y-shaped conduits 102 and 106. Each conduit includes an associated inlet nozzle and a pair of outlet channels. The inlet nozzles of conduit 103 and 104 comprise the outlet channels of conduit 102. Likewise the inlet nozzle of conduit 105 utilizes one of the outlet channels of 103. At each conduit junction or splitter are fluidic control nozzles and valves 107–111, respectively, connected to a pressurized source of fluid. The outlet channels not comprising an inlet nozzle of a subsequent conduit are connected to associated laser cavities. Preferably, fluid circuit 101 is fabricated from a number of stacked planar glass elements in which the appropriate nozzles and channels have been photoetched and fused together. Other material such as plastic and metal can be utilized in the fabrication of circuit 101 by well known molding techniques. It is also clear that other configurations can be utilized to fluidically control the flow of dye solution.

While presently preferred embodiments have been shown and described in particularity, the invention may otherwise be embodied within the scope of the appended claims.

What is claimed is:

1. A fluidally controlled dye laser comprising:
   A. at least a first laser cavity adapted for flow therethrough of a laser dye soltuion;
   B. at least one source of flowing dye solution;
   C. at least one conduit including an inlet nozzle connected to said source of dye solution and a pair of outlet channels, one of which outlet channels is connected to said laser cavity, said outlet channels being in communication with said inlet nozzle for selective wall-attachment flow of said dye solution from said inlet nozzle to one of said outlet channels; and D. at least a first fluidic control means having a pair of opposing fluidic control nozzles transversely positioned to said inlet nozzle and a source of fluid controllably connected to said fluidic control nozzles.

2. A fluidally controlled dye laser as set forth in claim 1 wherein said conduit is Y-shaped.

3. A fluidally controlled dye laser as set forth in claim 1 wherein said fluidic control nozzles are transversely positioned on said inlet nozzle and at a distance from said outlet channels equal to at least six times the width of said inlet nozzle.

4. A fluidally controlled dye laser as set forth in claim 1 including first and second dye solution sources and first and second conduits, said first dye source being connected to said first laser cavity through the inlet nozzle of said first conduit and one of said outlet channels of said first conduit, said second dye source being connected to said first laser cavity through the inlet nozzle of said second conduit and one of said outlet channels thereof, first and second fluidic control means connected to said first and second conduits for independently controlling the flow of said first and second dye solutions through said first cavity.

5. A fluidally controlled dye laser as set forth in claim 1 including a first dye source and a plurality of laser cavities, a plurality of conduits, the number of said conduits being one less than the number of cavities and a plurality of fluidic control means, the number of control means being equal to the number of conduits.

6. A dye laser as set forth in claim 5 wherein the inlet nozzles of each succeeding conduit after the first conduit is connected to an outlet channel of a preceding conduit, the inlet nozzle of said first conduit being connected to said source of dye solution and each outlet channel unconnected to a succeeding inlet nozzle being connected to a laser cavity.

7. A method for fluidally controlling the output characteristics of a dye laser, said method comprising:

A. continuously flowing at least one laser dye solution from at least one source along one of at least two paths in communication with said source, at least one of said paths passing through a laser cavity;

B. changing said flow to said other path by pulse injecting a fluid ahead of said paths and transversely of said flowing dye solution; and C. selectively repeating step B.

* * * * *